(12) United States Patent
Lin et al.

(10) Patent No.: US 10,809,761 B1
(45) Date of Patent: Oct. 20, 2020

(54) DISPLAY ASSEMBLY

(71) Applicant: Top Victory Investments Limited, Hong Kong (HK)

(72) Inventors: Yi-Sheng Lin, New Taipei (TW); Chia-Yu Liu, New Taipei (TW)

(73) Assignee: TOP VICTORY INVESTMENTS LIMITED, Hong Kong (HK)

(*) Notice: Subject to any disclaimer, the term of this patent is extended or adjusted under 35 U.S.C. 154(b) by 0 days.

(21) Appl. No.: 16/773,696

(22) Filed: Jan. 27, 2020

(30) Foreign Application Priority Data

Oct. 16, 2019 (TW) .............................. 108137208 A

(51) Int. Cl.
*G06F 1/16* (2006.01)
*F16M 11/04* (2006.01)

(52) U.S. Cl.
CPC .......... *G06F 1/1601* (2013.01); *F16M 11/045* (2013.01); *F16M 11/046* (2013.01)

(58) Field of Classification Search
CPC .... G06F 1/1601; F16M 11/046; F16M 11/045
See application file for complete search history.

(56) References Cited

U.S. PATENT DOCUMENTS

| | | | | |
|---|---|---|---|---|
| 8,348,206 B2* | 1/2013 | Wang | ..................... | F16M 11/10 248/176.1 |
| 8,520,371 B2* | 8/2013 | Peng | ..................... | F16M 11/105 361/679.01 |
| 8,605,429 B2* | 12/2013 | Shen | ..................... | F16M 13/005 361/679.55 |
| 9,338,902 B2* | 5/2016 | Liu | ..................... | F16M 11/041 |
| 10,013,019 B2* | 7/2018 | Juan | ..................... | G06F 1/182 |
| 2006/0076463 A1* | 4/2006 | Drew | ..................... | F16M 11/105 248/121 |
| 2006/0231667 A1* | 10/2006 | Tsuo | ..................... | F16M 11/041 242/384.5 |
| 2007/0262210 A1* | 11/2007 | Oh | ..................... | F16M 11/28 248/125.1 |
| 2009/0166502 A1* | 7/2009 | Wang | ..................... | F16M 11/105 248/423 |
| 2010/0219303 A1* | 9/2010 | Matsui | ..................... | F16M 11/105 248/122.1 |
| 2012/0043866 A1* | 2/2012 | Hsieh | ..................... | G06F 1/1601 312/223.1 |
| 2013/0094127 A1* | 4/2013 | Lu | ..................... | F16M 11/06 361/679.01 |
| 2016/0239045 A1* | 8/2016 | Tseng | ..................... | G06F 1/1601 |

* cited by examiner

*Primary Examiner* — Rockshana D Chowdhury
(74) *Attorney, Agent, or Firm* — Hamre, Schumann, Mueller & Larson, P.C.

(57) ABSTRACT

A display assembly is provided for being locked on a support, and includes a coupler, a display device, a locking mechanism, and a magnetic key. The coupler is secured to the support and has at least one retained piece. A back housing of the display device has at least one through hole for insertion of the retained piece. When the magnetic key is disposed to permit a first magnetically attractive member of the locking mechanism to be in register with a second magnetically attractive member to generate an acting force, a latch piece of the locking mechanism is moved to an unlocked position, where the retained piece is released from the latch piece, from a locked position, where the retained piece is retained by the latch piece.

16 Claims, 12 Drawing Sheets

DISPLAY ASSEMBLY

CROSS-REFERENCE TO RELATED APPLICATION

This application claims priority from Taiwanese invention patent application no. 108137208, filed on Oct. 16, 2019.

FIELD

The disclosure relates to a display assembly, more particularly to a display assembly for being locked on a support.

BACKGROUND

A display, such as a computer display, may be mounted on a support so that it can be viewed with easy by passersby. Considering that a display placed in public is likely to be stolen, it may be locked on a support by virtue of a Kensington lock. However, the operation of a Kensington lock is relatively complicated and the installation of the same may undesirably affect the aesthetic appearance of the display.

SUMMARY

Therefore, an object of the disclosure is to provide a novel display assembly that may be easily locked on a support.

According to the disclosure, a display assembly is provided for being locked on a support, and includes a coupler, a display device, a locking mechanism, and a magnetic key. The coupler is disposed for being secured to the support and has at least one retained piece. The display device includes a display panel and a back housing which is configured to enclose a backside of the display panel, and which has an outer surface and an inner surface that confronts the backside of the display panel. The back housing includes a coupling portion having at least one through hole such that when the coupling portion is brought into coupling engagement with the coupler, the retained piece is inserted through the through hole. The locking mechanism is mounted inside the display device between the back housing and the display panel and includes a retaining mount, a first major magnetically attractive member, a slider unit, and at least one biasing spring. The retaining mount is mounted on the inner surface of the back housing. The first major magnetically attractive member is retained by the retaining mount to be movable relative to the back housing between a first position and a second position. The slider unit is coupled to move together with the first major magnetically attractive member, and includes at least one latch piece that is movable between a locked position, where the first major magnetically attractive member is in the first position and the retained piece is retained by the latch piece so as to prevent detachment of the display device from the support, and a unlocked position, where the first major magnetically attractive member is in the second position and the latch piece is retracted from the retained piece so as to allow the detachment of the display device from the support. The at least one biasing spring is disposed to bias the latch piece to the locked position, thereby keeping the first major magnetically attractive member in the first position. The magnetic key includes a second major magnetically attractive member orientated such that when the magnetic key is disposed on the outer surface of the back housing to permit the second major magnetically attractive member to be brought into register with the first major magnetically attractive member to generate an acting force on the first major magnetically attractive member, the first major magnetically attractive member is forced by the acting force to the second position, thereby displacing the latch piece to the unlocked position.

With the provision of the novel display assembly, the display device may be easily locked on and detached from the support without undesirably affecting the aesthetic appearance of the display device.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
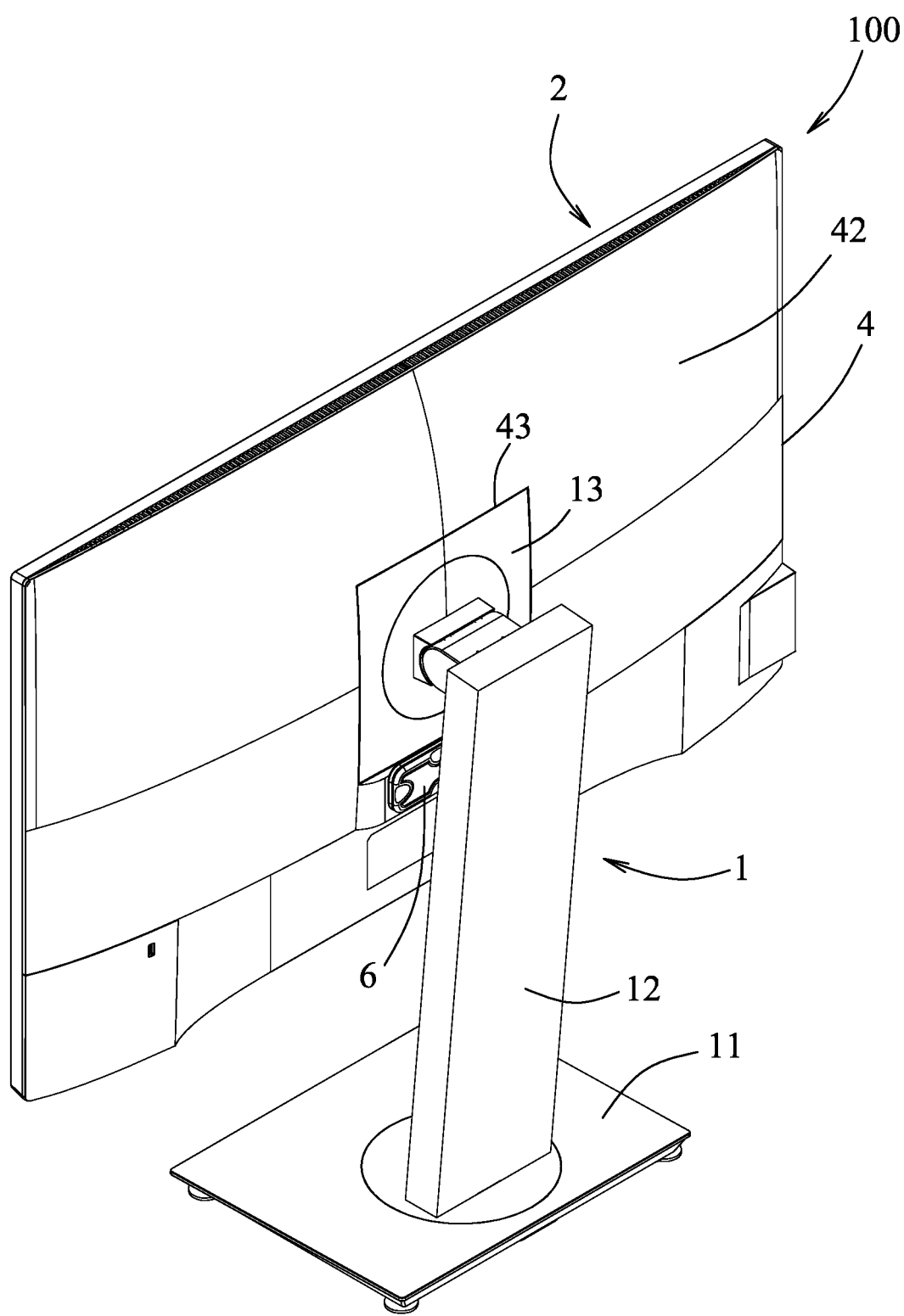
FIG. 1 is a rear perspective view of a display assembly according to an embodiment of the disclosure.

To aid in describing the disclosure, directional terms may be used in the specification and claims to describe portions of the present disclosure (e.g., front, rear, left, rig top, bottom, etc.). These directional definitions are intended to merely assist in describing and claiming the disclosure and are not intended to limit the disclosure in any way.

Referring to FIGS. 1 to 5, a display assembly 100 according to an embodiment of the disclosure is shown to include a coupler 13, a display device 2, a locking mechanism 5, and a magnetic key 6. The display assembly 100 is provided for being locked on a support 1. The support 1 may include a base 11 and a support beam 12.

The coupler 13 is disposed for being secured to the support 1 and has at least one retained piece 133. In an embodiment shown in FIGS. 3 and 4, the coupler 13 may be mounted on an upper end of the support beam 12.

The display device 2 includes a display panel 3 and a back housing 4 which is configured to enclose a backside of the display panel 3, and which has an outer surface 42 and an inner surface 41 that confronts the backside of the display panel 3. The back housing 4 includes a coupling portion 43 having at least one through hole 432 such that when the coupling portion 43 is brought into coupling engagement with the coupler 13, the retained piece 133 is inserted through the back housing 4 via the through hole 432.

Figure 5:
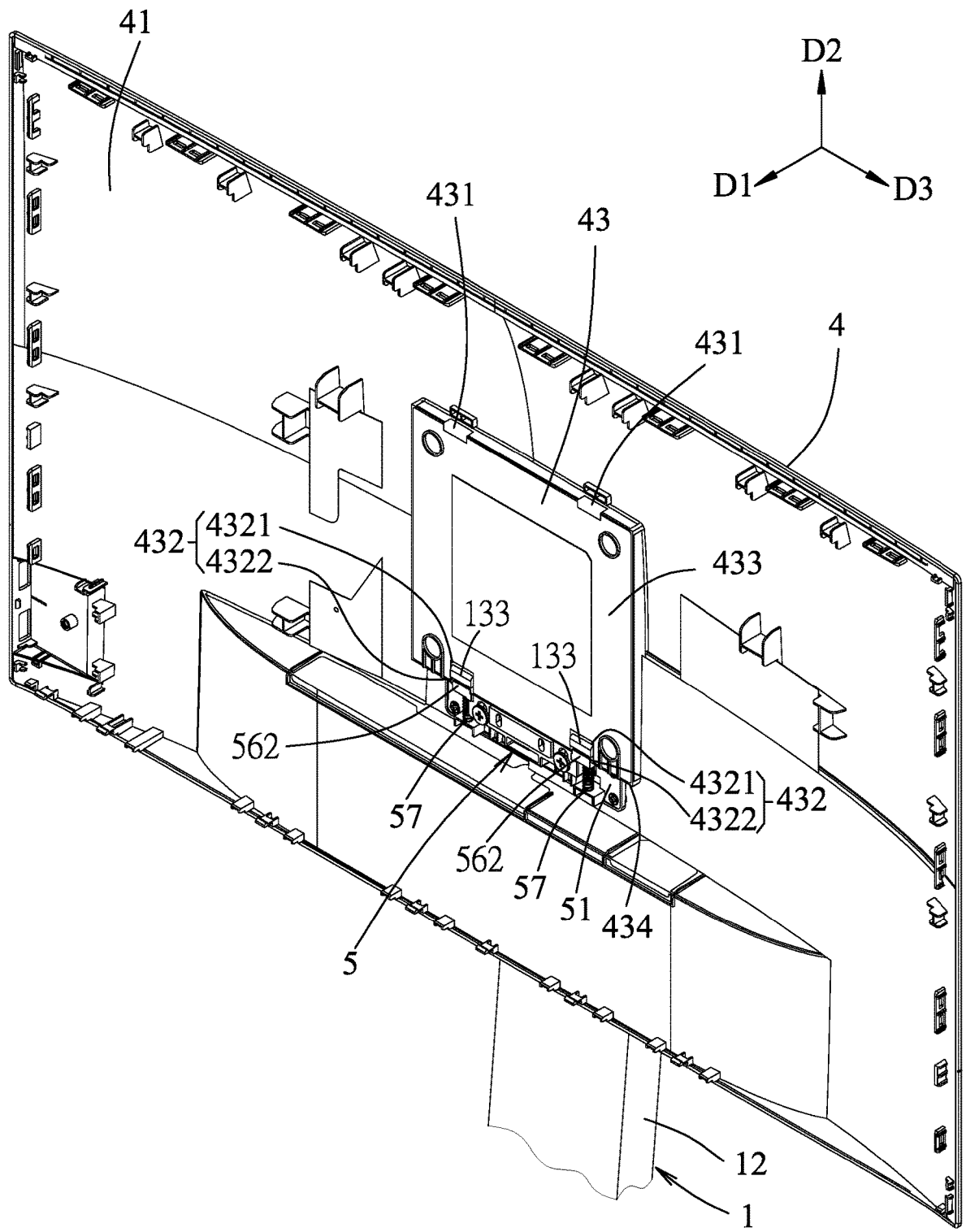
FIG. 5 is a fragmentary perspective view illustrating a back housing of the display assembly mounted on the support.
Figure 6:
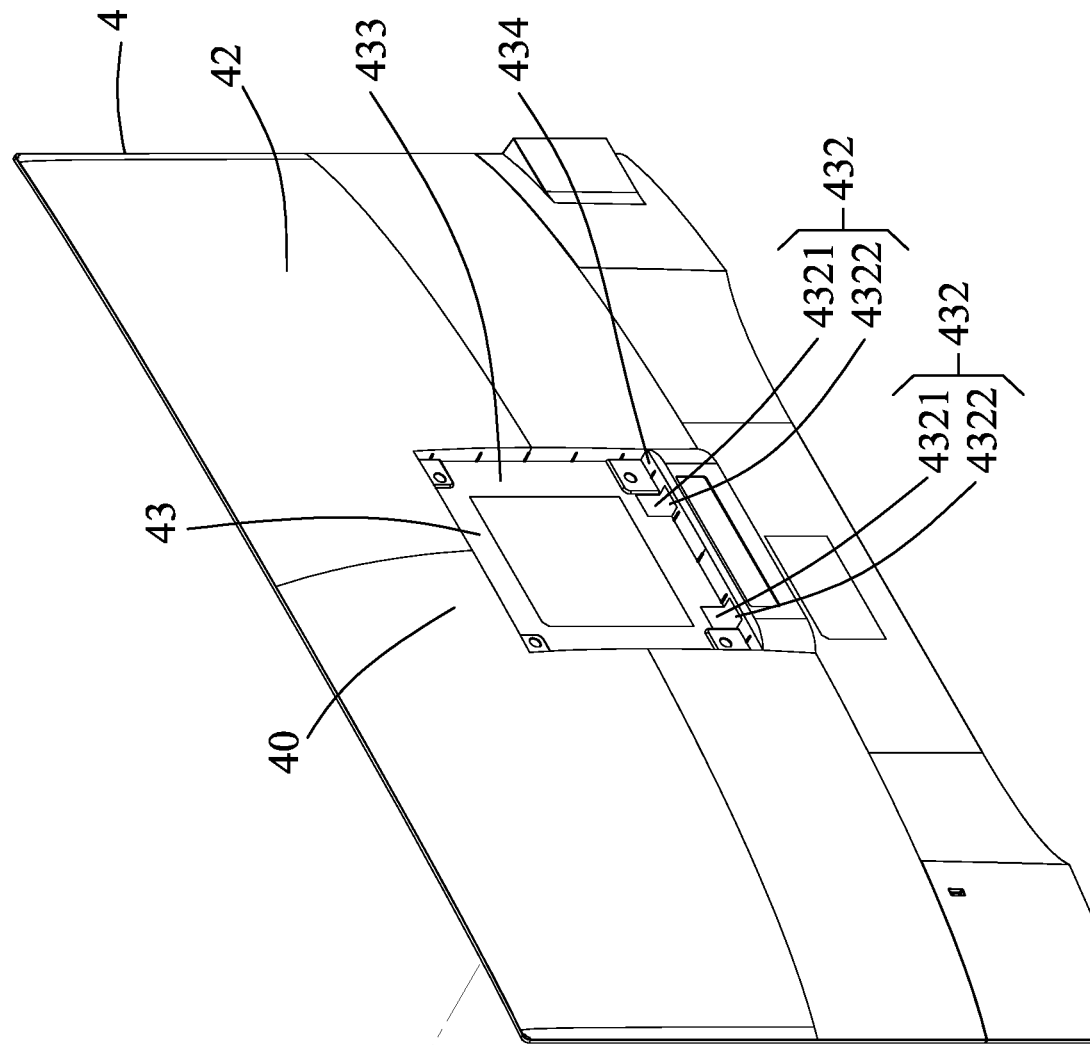
FIG. 6 is a rear partially exploded perspective view of the back housing and a locking mechanism of the display assembly.

In an embodiment shown in FIGS. 5 and 6, the back housing 4 may have a major portion 40 around the coupling portion 43. The coupling portion 43 may be in the form of a cavity on the outer surface 42 of the back housing 4 and may be in the form of a protrusion on the inner surface 41 of the back housing 4. The coupling portion 43 may include a base wall 433 and a surrounding wall 434 which extends from a periphery of the base wall 433 to the major portion 40. The through hole 432 extends through a juncture between the base wall 433 and the surrounding wall 434, and includes a first hole portion 4321 in the base wall 433, and a second hole portion 4322 in the surrounding wall 434.

Figure 12:
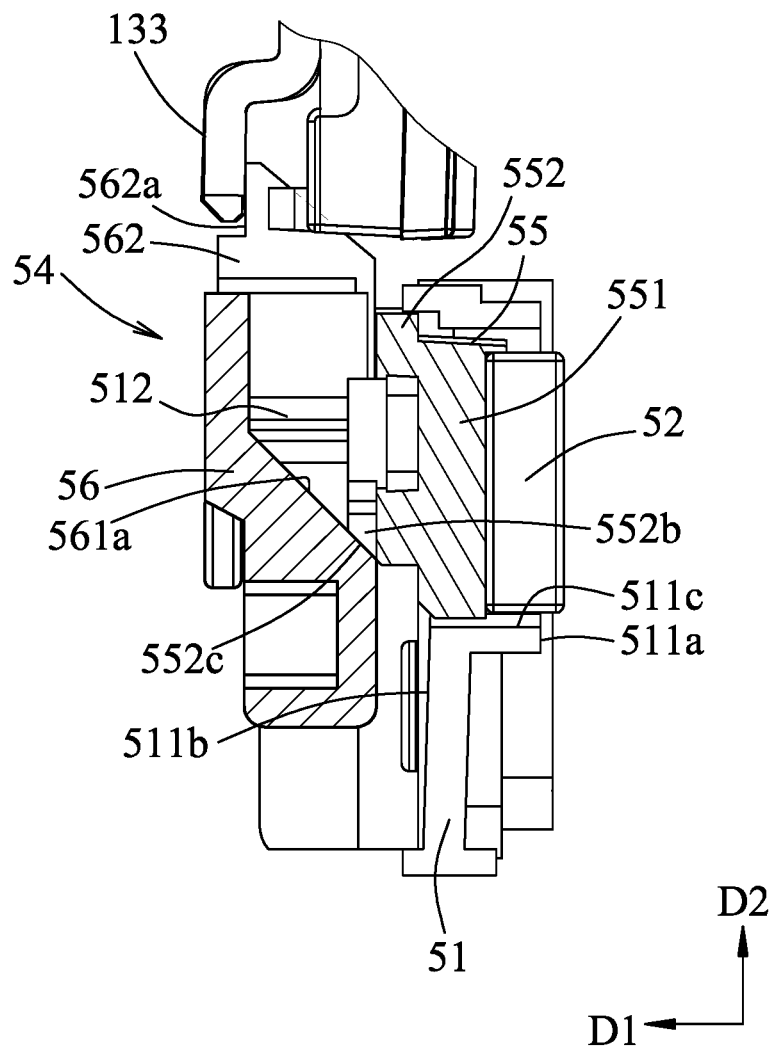
FIG. 12 is a fragmentary partially omitted cross-sectional view in which the back housing is omitted, and which illustrates a latch piece of the locking mechanism in a locked position.
Figure 13:
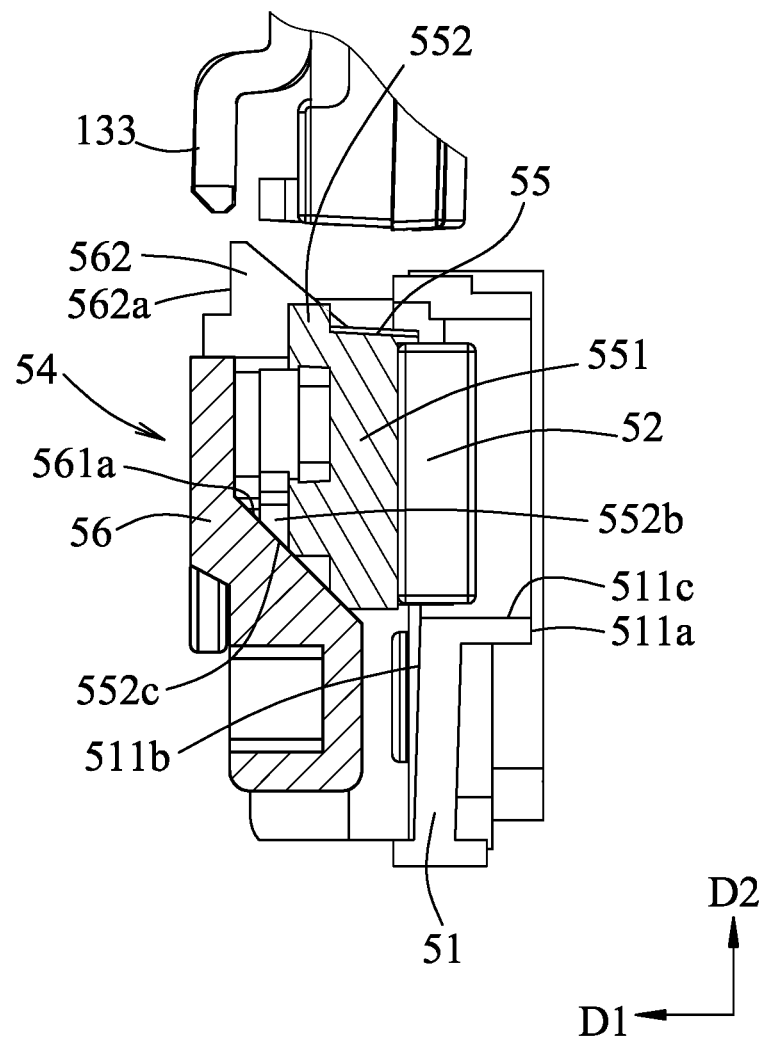
FIG. 13 is similar to FIG. 12 but illustrating the latch piece in an unlocked position.

The locking mechanism 5 is mounted inside the display device 2 between the back housing 4 and the display panel 3, and includes a retaining mount 51, a first major magnetically attractive member 52, a slider unit 54, and at least one biasing spring 57. The retaining mount Si is mounted on an inner surface 41 of the back housing 4. The first major magnetically attractive member 52 is retained by the retaining mount 51 to be movable relative to the back housing 4 shown in FIG. 5 between a first position (FIG. 12) and a second position (FIG. 13).

Figure 9:
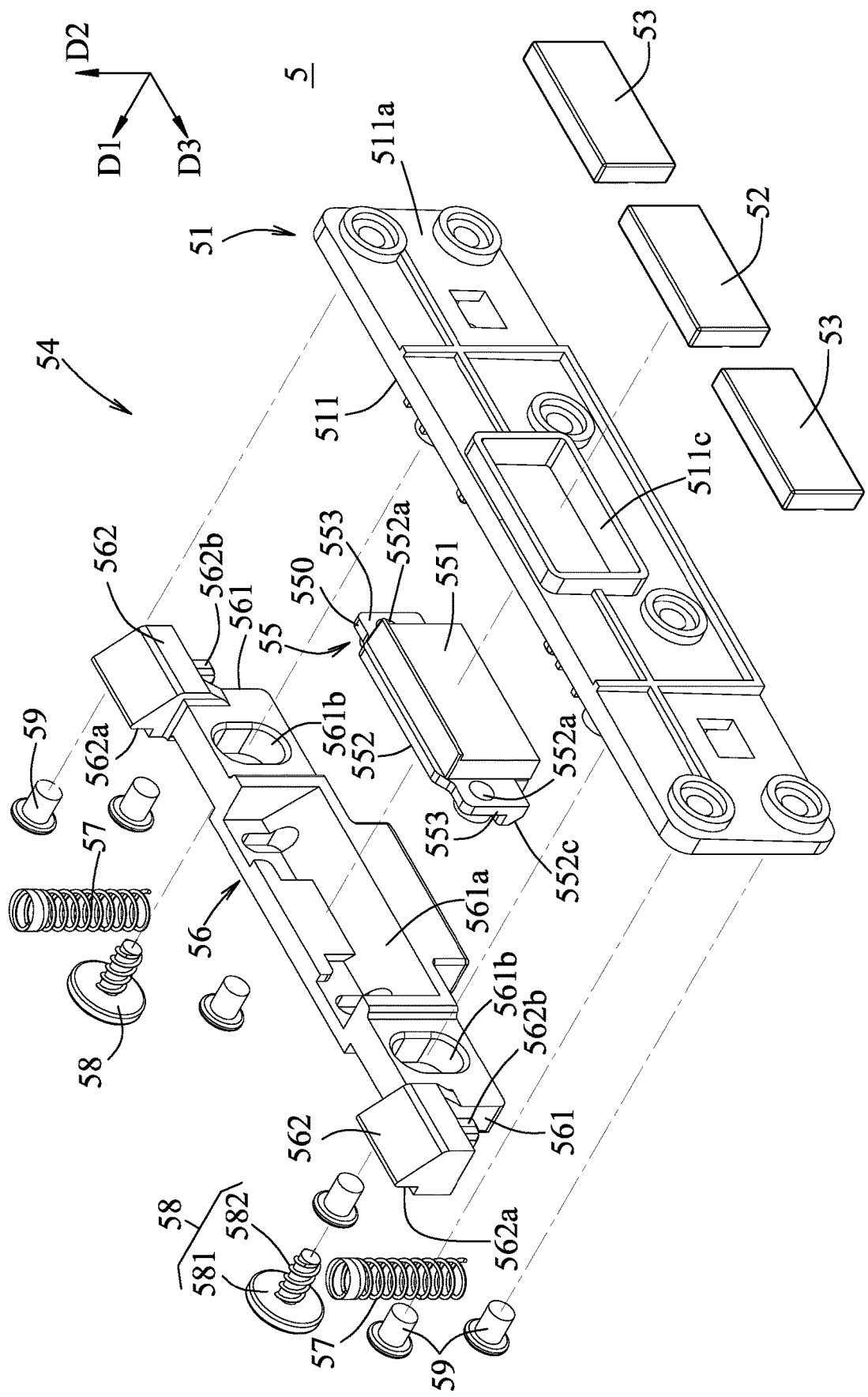
FIG. 9 is an exploded perspective view of the locking mechanism.
Figure 10:
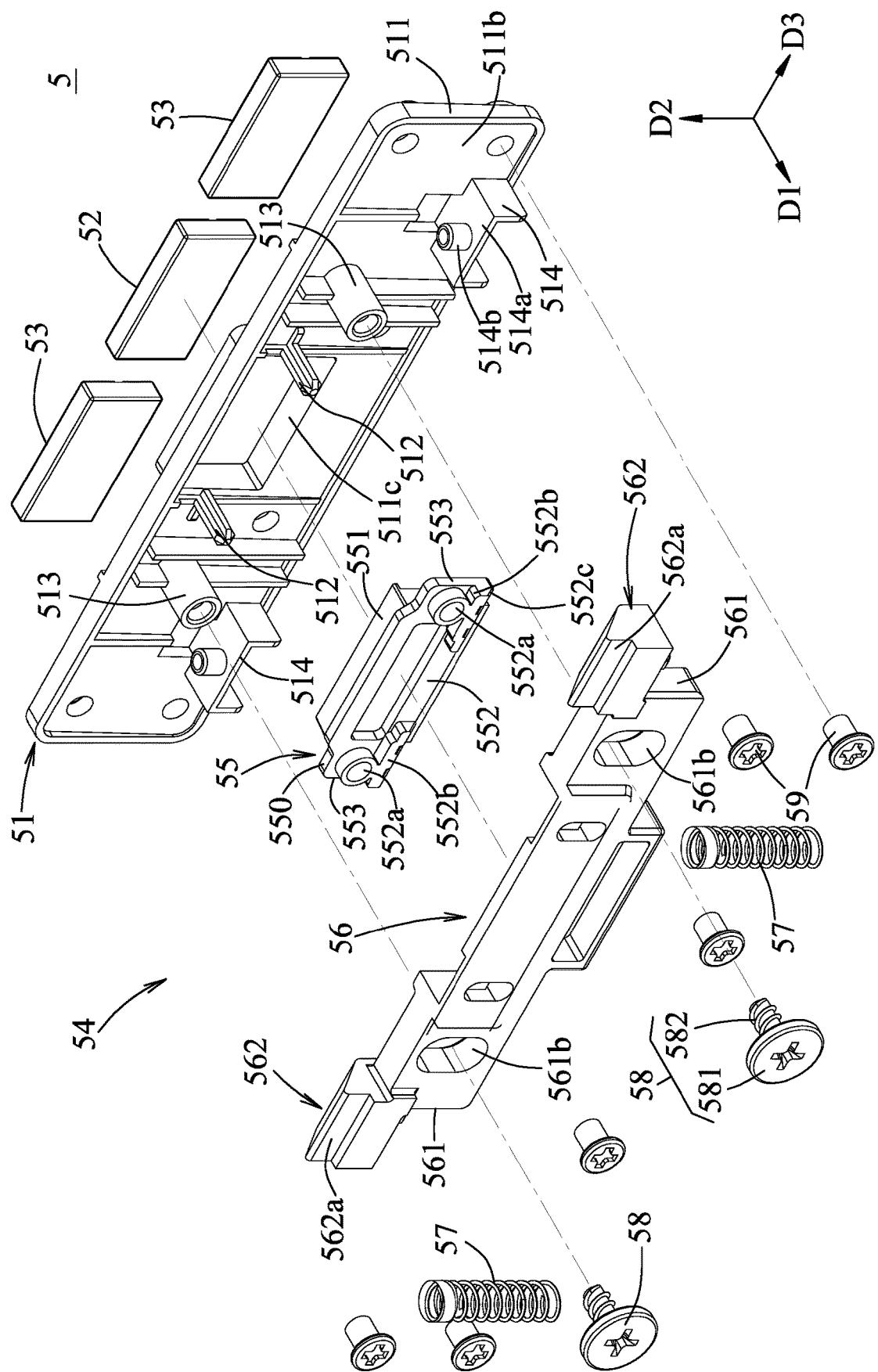
FIG. 10 is similar to FIG. 9 but illustrates from a different angle.
Figure 11:
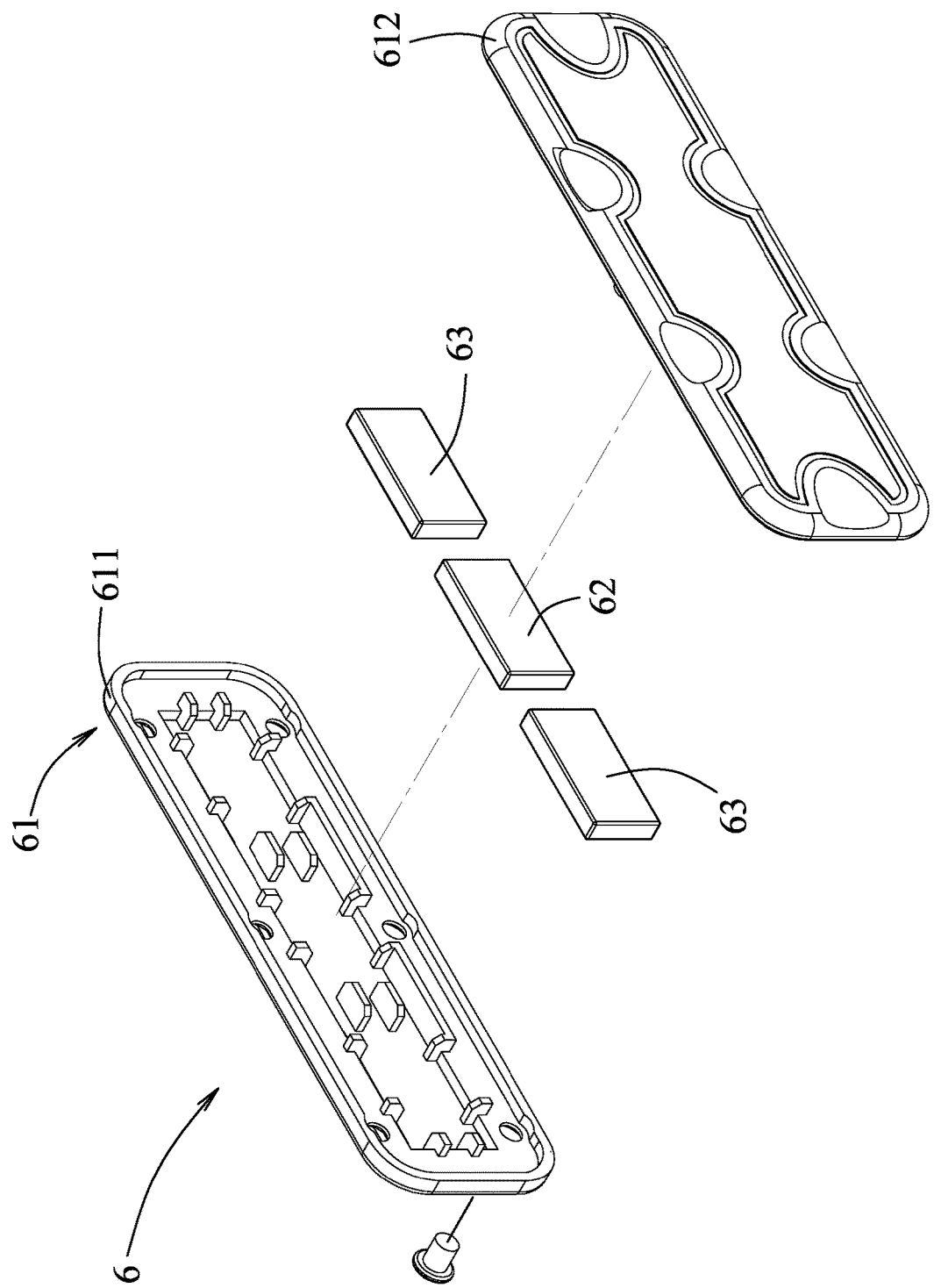
FIG. 11 is an exploded perspective view of a magnetic key of the display assembly.

In an embodiment shown in FIGS. 5 and 9-10, the retaining mount 51 includes a main body 511 having a first major surface 511a, a second major surface 511b, and a passage 511c. The first major surface 511a is mounted to the major portion 40 on the inner surface 41 of the back housing 4 in proximity to the coupling portion 43 by virtue of, for example, a plurality of screws 59. The second major surface 511b is opposite to the first major surface 511a in a first direction (D1). The passage 511c extends in the first direction (D1) through the first and second major surfaces 511a, 511b. The passage 511c is configured to permit the first major magnetically attractive member 52 to be retained therein and to be moveable in the first direction (D1) between the first and second positions (FIGS. 11 and 12).

The slider unit 54 is coupled to move together with the first major magnetically attractive member 52, and includes at least one latch piece 562 that is movable between a locked position and a unlocked position. In the locked position, as shown in FIG. 12, the first major magnetically attractive member 52 is in the first position and the retained piece 133 is retained by the latch piece 562 so as to prevent detachment of the display device 2 from the support 1. In the unlocked position, as shown in FIG. 13, the first major magnetically attractive member 52 is in the second position and the latch piece 562 is retracted from the retained piece 133 so as to allow the detachment of the display device 2 from the support 1.

The biasing spring 57 is disposed to bias the latch piece 562 to the locked position (FIGS. 5 and 12), thereby keeping the first major magnetically attractive member 52 in the first position.

Figure 4:
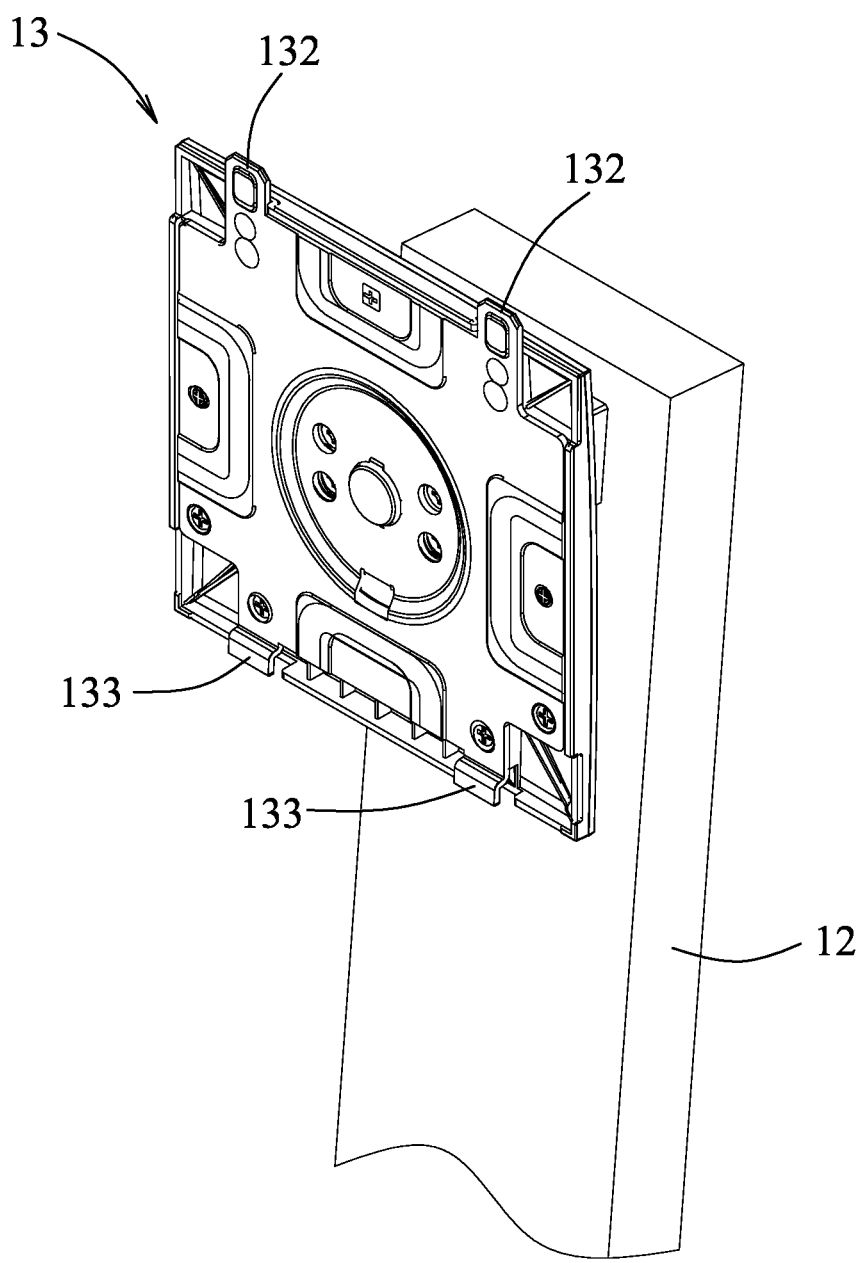
FIG. 4 is a fragmentary enlarged view illustrating a coupler of the display assembly on a support.

In an embodiment shown in FIGS. 4 and 5, the coupler 13 may further have at least one tab 132, and the coupling portion 43 may further have at least one retaining hole 431 configured such that the coupling portion 43 is permitted to be brought into coupling engagement with the coupler 13 only when the tab 132 is retained in the retaining hole 431, thereby allowing the retained piece 133 to be inserted through the through hole 432. On the other hand, the tab 132 is permitted to be removed from the retaining hole 431 only when the retained piece 133 is removed from the through hole 432.

In an embodiment shown in FIGS. 4-6 and 12-13, the retained piece 133 is configured to be inserted through the back housing 4 via the first hole portion 4321. The latch piece 562, when in the locked position (FIGS. 5 and 12), is extended out of the second hole portion 4322 to retain the retained piece 133, thereby preventing the detachment of the display device 2 from the support 1. The latch piece 562, when in the unlocked position (FIG. 13), is retracted inside of the back housing 4, thereby allowing the detachment of the display device 2 from the support 1.

In an embodiment shown in FIGS. 9 and 10, the slider unit 54 may further include a first slider block 55 and a second slide block 56. The first slide block 55 has a first contact structure 552, and is disposed such that when the first major magnetically attractive member 52 is moved to the second position (FIG. 13) from the first position (FIG. 12), the first slide block 55 is forced by the first major magnetically attractive member 52 to slide in the first direction (D1) to a distal position (FIG. 13), which is distal from the back housing 4 shown in FIG. 5, from a proximal position (FIG. 12), which is proximate to the back housing 4. The second slide block 56 has the latch piece 562 mounted thereon to move therewith, and has a second contact structure 561a configured to be in movable contact with the first contact structure 552 such that in response to the sliding movement of the first slide block 55 from the proximal position (FIG. 12) to the distal position (FIG. 13), the second slide block 56 is, as a result of moving contact between the first and second contact structures 552, 561a, forced by the first slide block 55 to slide in a second direction (D2) transverse to the first direction (D1), thereby displacing the latch piece 562 in the second direction (D2) from the locked position (FIG. 12) to the unlocked position (FIG. 13).

In an embodiment shown in FIGS. 9, 10, 12, and 13, the first contact structure 561a is a ramping surface, and the second contact structure 552 has a beveled surface 552c which is in movable contact with the ramping surface 561a.

In an embodiment shown in FIGS. 9, 10, 12, and 13, the second contact structure 552 has two protuberances 552b which are respectively protruded in the first direction (D1), and which respectively have two beveled edges that cooperatively define the beveled surface 552c.

In an embodiment shown in FIG. 5, the coupling portion 43 has two of the retaining holes 431 and two of the through holes 432. Each of the through holes 432 is opposite to the respective retaining hole 431 in the second direction (D2). The retaining holes 431 are spaced apart from each other in a third direction (D3) transverse to both the first and second directions (D1, D2). The through holes 432 are spaced apart from each other in the third direction (D3).

Furthermore, the coupler 13 may include two of the tabs 132 which are for being retained respectively in the retaining holes 431, and two of the retained pieces 133 which are spaced apart from each other such that when the coupling portion 43 is brought into coupling engagement with the coupler 13, the retained pieces 133 are respectively inserted through the first hole portions 4321 of the through holes 432.

Moreover, the slider unit 54 includes two of the latch pieces 562 mounted on the second slide block 56 such that when the latch pieces 562 are in the locked position, the latch pieces 562 are extended out of the second hole portions 4322 of the through holes 432 so as to retain the retained pieces 133, respectively.

In an embodiment shown in FIGS. 9 and 10, the second slide block 56 has two lateral ends 561 opposite to each other in the third direction (D3), and the latch pieces 562 are mounted respectively to the two lateral ends 561 of the second slide block 56. Each of the latch pieces 562 has a retaining surface 562a which is disposed to retain the respective retained piece 133, and a first coupling pin 562b which is opposite to the retaining surface 562a in the second direction (D2).

In an embodiment shown in FIG. 10, the locking mechanism 5 may further include two stages 514 which are mounted on the second major surface 511b of the retaining mount 511 to extend respectively in the first direction (D1), and which are spaced apart from each other in t third direction (D3). Each of the stages 514 has a flat surface 514a formed with a second coupling pin 514b which is disposed to confront the respective first coupling pin 562b.

Figure 8:
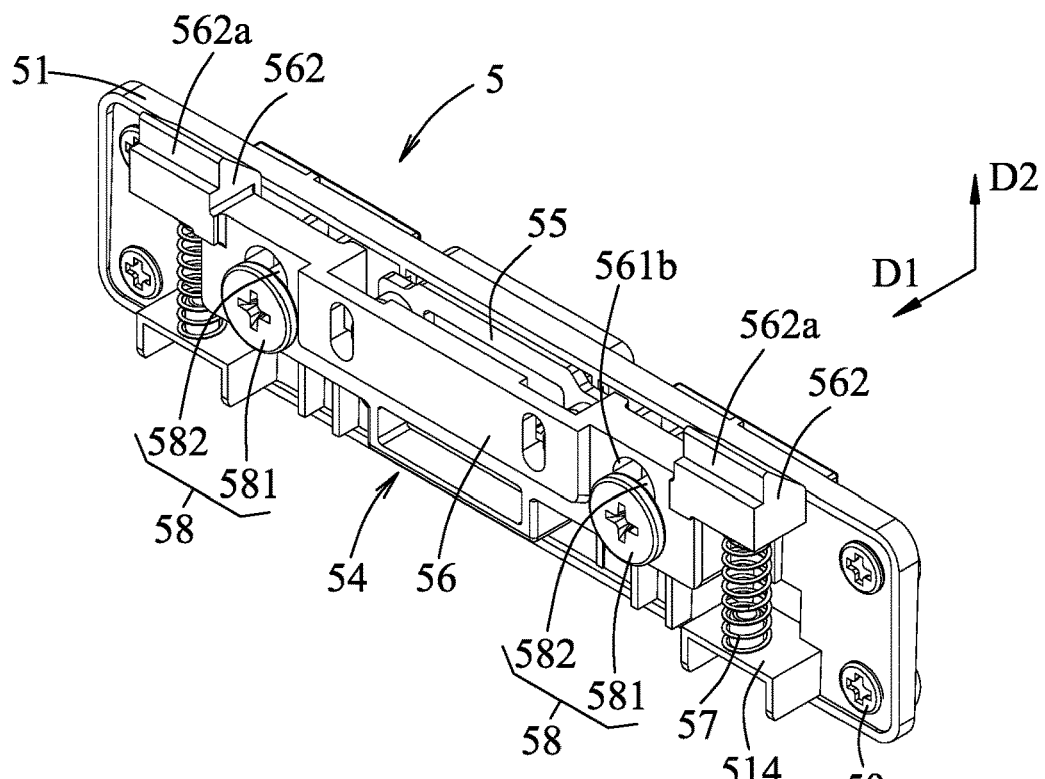
FIG. 8 is a front perspective view of the locking mechanism.

In an embodiment shown in FIGS. 8-10, the locking mechanism 5 may include two of the biasing springs 57 each of which is disposed between a respective one of the latch pieces 562 and a respective one of the stages 514 so as to bias the respective latch piece 562 to the locked position (FIG. 12). Each of the biasing springs 57 may be mounted between the respective first coupling pin 562b and the respective second coupling pine 514b.

In an embodiment shown in FIGS. 9 and 10, the locking mechanism 5 may further include a pair of guiding pins 512 which extend respectively in the first direction (D1) and which are mounted on the second major surface 511b of the retaining mount 51 at two opposite sides of the passage 511c. The first slide block 55 may includes a front pushing segment 550 and a rear pushed segment 551. The rear pushed segment 551 is disposed to be pushed by the first major magnetically attractive member 52 so as to cause movement of the first slide block 55 to the distal position (FIG. 13). The front pushing segment 550 is connected to the rear pushed segment 551, and has the first contact structure 552 that is opposite to the rear pushed segment 551 in the first direction (D1). The front pushing segment 550 has two ear regions 553 which are disposed at two opposite sides of the rear pushed segment 551. Each of the ear regions 553 has a first guided hole 552a configured for extension of a respective one of the guiding pins 512 so as to permit the sliding movement of the first slide block 55 to be guided by the guiding pins 512.

In an embodiment shown in FIGS. 9 and 10, the second slide block 56 may have a pair of second guided holes 561b which extend respectively in the second direction (D2) and which are disposed at two opposite sides of the second contact structure 561a. The locking mechanism 5 may further include a pair of guiding stems 513 which are mounted on the second major surface 511b of the retaining mount 51, and which extend in the first direction (D1) respectively through the second guided holes 561b so as to permit the sliding movement of the second slide block 56 in the second direction (D2) to be guided by the guiding stems 513.

In an embodiment shown in FIGS. 8-10, two screws 58 may be further provided. Each of the screws 58 may have an enlarged head 581 and a screw stem 582. The screw stem 582 extends through the respective second guided hole 561b to be secured to the respective guiding stem 513 so as to permit the enlarged head 581 to slidably abut a front side of the second slide block 56. With the provision of the screws 58, the second slide block 56 may be prevented from sliding in the first direction (D1).

Figure 2:
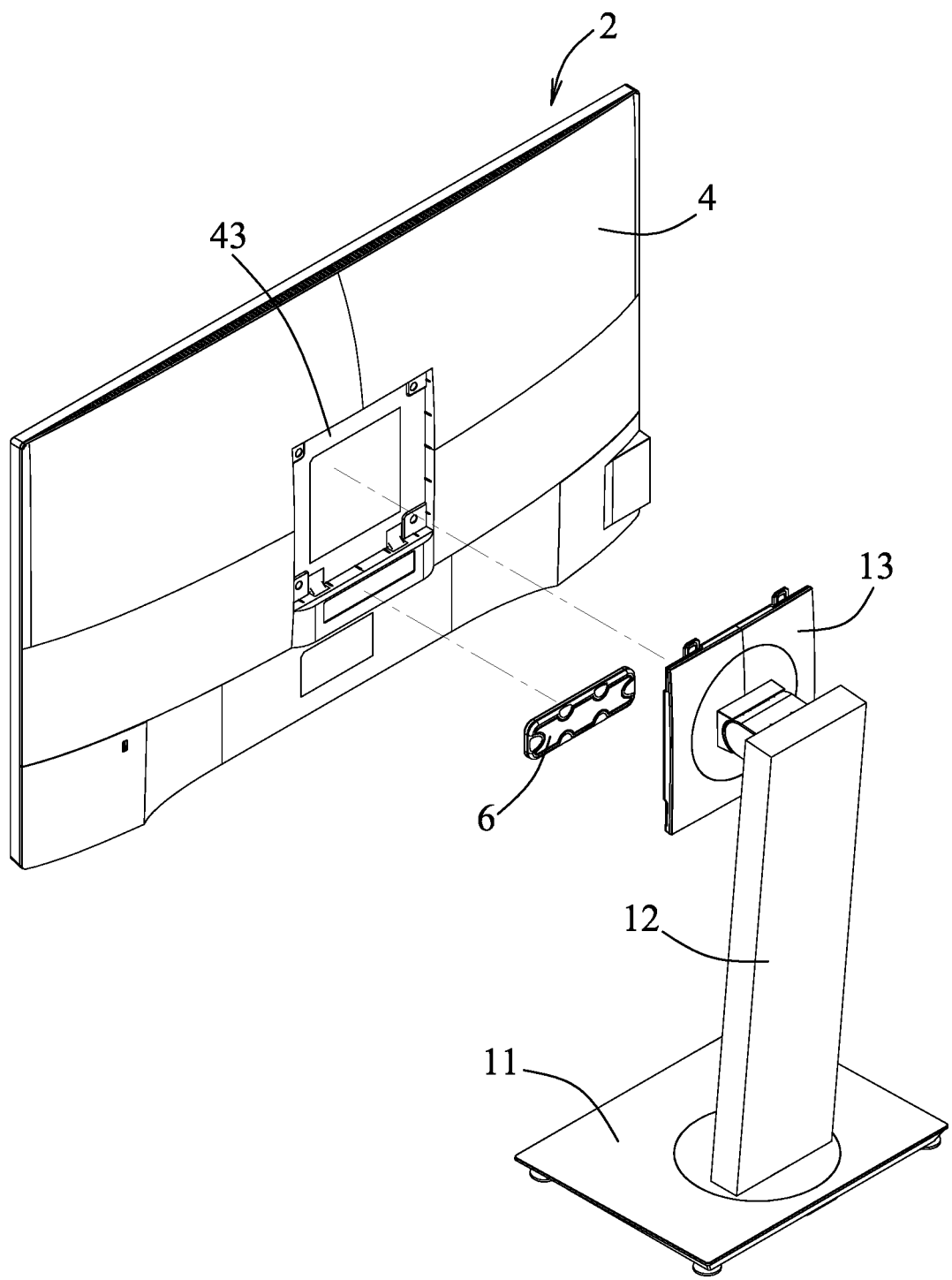
FIG. 2 is a rear partially exploded perspective view of the display assembly.
Figure 3:
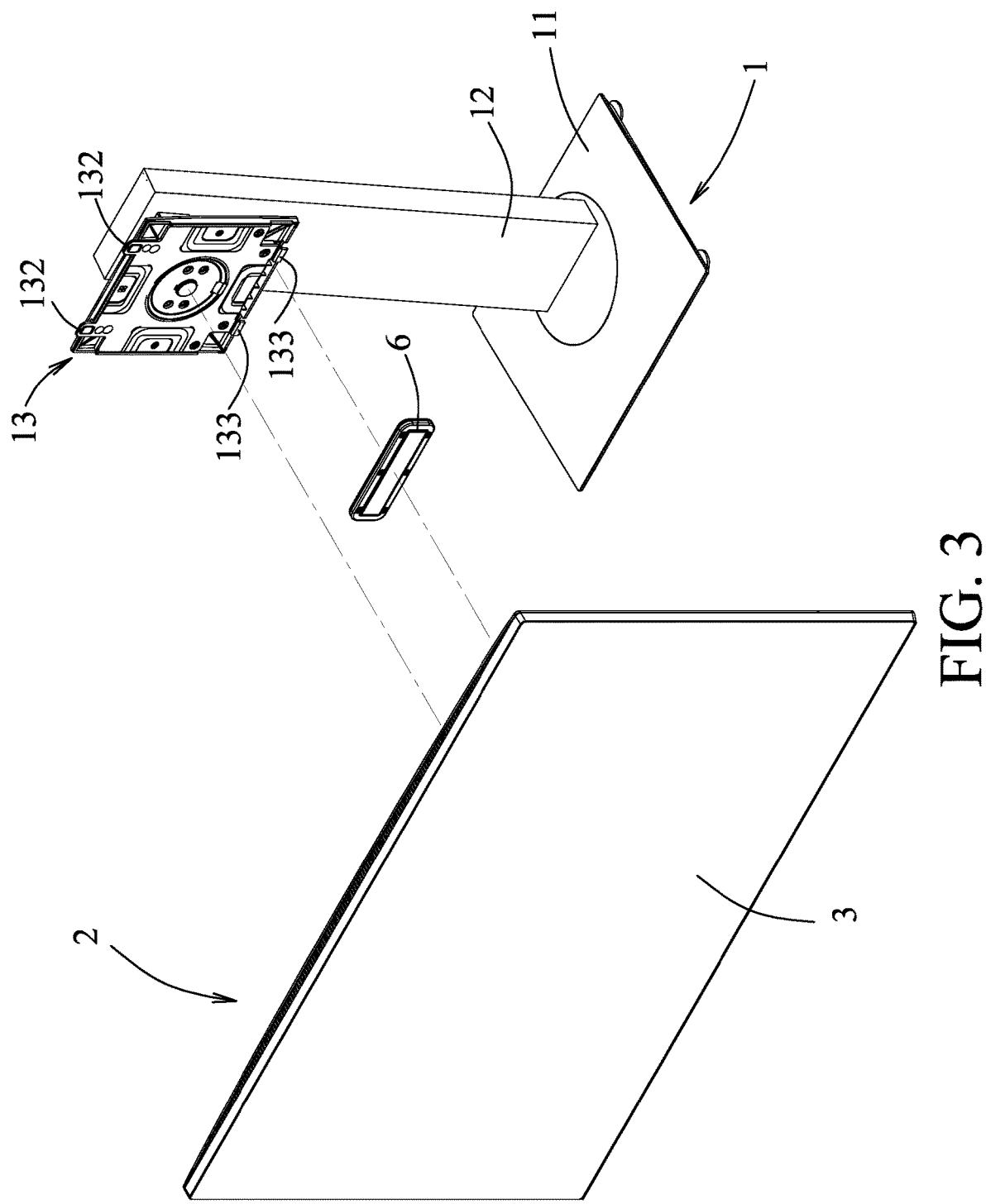
FIG. 3 is a front partially exploded perspective view of the display assembly.
Figure 7:
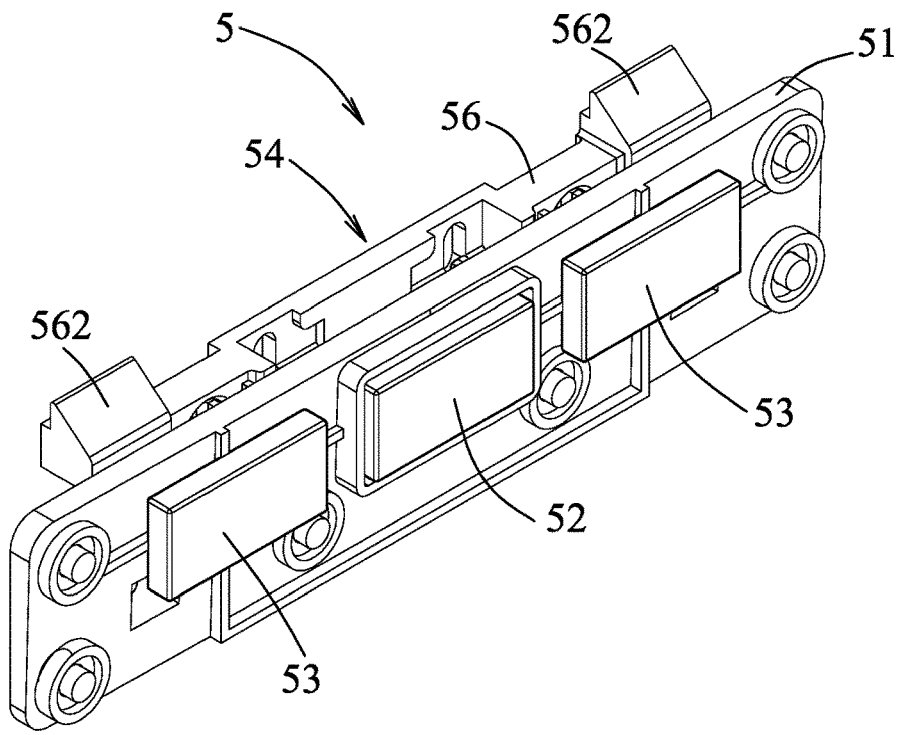
FIG. 7 is a rear perspective view of the locking mechanism.

As shown in FIGS. 2, 7, and 11, the magnetic key 6 includes a second major magnetically attractive member 62 orientated such that when the magnetic key 6 is disposed on the outer surface 42 of the back housing 4 to permit the second major magnetically attractive member 62 to be brought into register with the first major magnetically attractive member 52 to generate an acting force on the first major magnetically attractive member 52, the first major magnetically attractive member 52 is forced by the acting force to the second position (FIG. 13), thereby displacing the latch piece 562 to the unlocked position. The magnetic key 6 may be disposed on the outer surface 42 of the back housing 4 during a period when the display device 2 is locked on or detached from the support 1.

In an embodiment, the first major magnetically attractive member 52, when being respectively in the first and second positions shown respectively in FIGS. 11 and 12, is proximate to and distal from the back housing 4, and the acting force is a repulsive force generated between the first and second major magnetically attractive members 52, 62. That is to say, the first and second major magnetically attractive members 52, 62 have the same one of north and south poles confronting each other.

In an embodiment shown in FIGS. 7, 9, and 10, the locking mechanism 5 further includes at least one first auxiliary magnetically attractive member 53 which is sandwiched between the retaining mount 51 and the back housing 4.

In an embodiment shown in FIG. 11, the magnetic key 6 may further include at least one second auxiliary magnetically attractive member 63 which is orientated such that when the repulsive force is generated, the first and second auxiliary magnetically attractive members 53, 63 are brought into register with each other to generate therebetween an attractive force which is in a sufficient extent to keep the magnetic key 6 on the outer surface 42 of the back housing 4, thereby ensuring the first major magnetically attractive member 52 to be forced by the repulsive force to move to the second position. In other words, the first and second auxiliary magnetically attractive members 53, 63 have different ones of south and north poles confronting each other. Please not that the first major and auxiliary magnetically attractive members 53 may have different ones of south and north poles confronting the back housing 4.

In an embodiment shown in FIG. 11, the magnetic key 6 may further include a key casing 61 configured to retain therein the second major and auxiliary magnetically attractive members 62, 63. The key casing 61 may include a first part 611 and a second part 612 which are detachably secured to each other to retain therebetween the second major and auxiliary magnetically attractive members 62, 63.

In an embodiment shown in FIGS. 7, 9, and 10, the locking mechanism 5 may further include a plurality of the first auxiliary magnetically attractive members 53 which are separately sandwiched between the retaining mount 51 and the back housing 4.

In an embodiment shown in FIG. 11, the magnetic key 6 may further include a plurality of second auxiliary magnetically attractive members 63 which are orientated such that the second auxiliary magnetically attractive members 63 are permitted to be respectively in register with the first auxiliary magnetically attractive members 53 to generate the attractive force. Please not that the first auxiliary magnetically attractive members 53 may have the same or different ones of south and north poles confronting the back housing 4.

In FIGS. 7, 9, and 10, only two of the first auxiliary magnetically attractive members 53 are shown, and in FIG. 11, only two of the second auxiliary magnetically attractive members 63 are shown. Please note that the number of the first and second auxiliary magnetically attractive members 53, 63 may be subject to variation and that they may have the same and/or different ones of south and north poles confronting the back housing 4. As such, a specific locking mechanism and a matching magnetic key may be provided based on designs.

In sum, with the provision of the display assembly 100, the display device 2 may be easily locked on and detached from the support 1 without undesirably affecting the aesthetic appearance of the display device 2.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A display assembly for being locked on a support, said display assembly comprising:
   a coupler disposed for being secured to the support and having at least one retained piece;
   a display device including a display panel and a back housing which is configured to enclose a backside of said display panel, and which has an outer surface and an inner surface that confronts said backside of said display panel, said back housing including a coupling portion having at least one through hole such that when said coupling portion is brought into coupling engagement with said coupler, said retained piece is inserted through said through hole;
   a locking mechanism mounted inside said display device between said back housing and said display panel, and including
      a retaining mount mounted on said inner surface of said back housing,
      a first major magnetically attractive member which is retained by said retaining mount to be movable relative to said back housing between a first position and a second position,
      a slider unit which is coupled to move together with said first major magnetically attractive member, and which includes at least one latch piece that is movable between a locked position, where said first major magnetically attractive member is in the first position and said retained piece is retained by said latch piece so as to prevent detachment of said display device from the support, and a unlocked position, where said first major magnetically attractive member is in the second position and said latch piece is retracted from said retained piece so as to allow the detachment of said display device from the support, and
      at least one biasing spring disposed to bias said latch piece to the locked position, thereby keeping said first major magnetically attractive member in the first position; and
   a magnetic key including a second major magnetically attractive member orientated such that when said magnetic key is disposed on said outer surface of said back housing to permit said second major magnetically attractive member to be brought into register with said first major magnetically attractive member to generate an acting force on said first major magnetically attractive member, said first major magnetically attractive member is forced by the acting force to the second position, thereby displacing said latch piece to the unlocked position.

2. The display assembly according to claim 1, wherein said first major magnetically attractive member, when being respectively in the first and second positions, is proximate to and distal from said back housing, and the acting force is a repulsive force generated between said first and second major magnetically attractive members.

3. The display assembly according to claim 2,
   wherein said locking mechanism further includes at least one first auxiliary magnetically attractive member which is sandwiched between said retaining mount and said back housing; and
   wherein said magnetic key further includes at least one second auxiliary magnetically attractive member which is orientated such that when the repulsive force is generated, said first and second auxiliary magnetically attractive members are brought into register with each other to generate therebetween an attractive force which is in a sufficient extent to keep said magnetic key on said outer surface of said back housing, thereby ensuring said first major magnetically attractive member to be forced by the repulsive force to move to the second position.

4. The display assembly according to claim 3, wherein said magnetic key further includes a key casing configured to retain therein said second major magnetically attractive member and said second auxiliary magnetically attractive member.

5. The display assembly according to claim 3,
   wherein said locking mechanism further includes a plurality of said first auxiliary magnetically attractive members which are separately sandwiched between said retaining mount and said back housing; and
   wherein said magnetic key further includes a plurality of second auxiliary magnetically attractive members which are orientated such that said second auxiliary magnetically attractive members are permitted to be respectively in register with said first auxiliary magnetically attractive members to generate the attractive force.

6. The display assembly according to claim 1,
   wherein said back housing has a major portion around said coupling portion;

wherein said coupling portion is in the form of a cavity on said outer surface of said back housing and is in the form of a protrusion on said inner surface of said back housing, said coupling portion including a base wall and a surrounding wall which extends from a periphery of said base wall to said major portion; and wherein said through hole extends through a juncture between said base wall and said surrounding wall, and includes a first hole portion in said base wall, and a second hole portion in said surrounding wall.

7. The display assembly according to claim 6, wherein said retained piece is configured to be inserted through said back housing via said first hole portion;

wherein said latch piece, when in the locked position, is extended out of said second hole portion to retain said retained piece, thereby preventing the detachment of said display device from the support; and wherein said latch piece, when in the unlocked position, is retracted inside of said back housing, thereby allowing the detachment of said display device from the support.

8. The display assembly according to claim 7, wherein said retaining mount has a first major surface which is mounted to said major portion on said inner surface of said back housing, a second major surface which is opposite to said first major surface in a first direction, and a passage which extends in the first direction through said first and second major surfaces, said passage being configured to permit said first major magnetically attractive member to be retained therein and to be moveable in the first direction between the first and second positions.

9. The display assembly according to claim 6, wherein said slider unit further includes
  a first slide block having a first contact structure, and disposed such that when said first major magnetically attractive member is moved to the second position from the first position, said first slide block is forced by said first major magnetically attractive member to slide in the first direction to a distal position, which is distal from said back housing, from a proximal position, which is proximate to said back housing, and
  a second slide block which has said latch piece mounted thereon to move therewith, and which has a second contact structure configured to be in movable contact with said first contact structure such that in response to the sliding movement of said first slide block from the proximal position to the distal position, said second slide block is, as a result of moving contact between said first and second contact structures, forced by said first slide block to slide in a second direction transverse to the first direction, thereby displacing said latch piece in the second direction from the locked position to the unlocked position.

10. The display assembly according to claim 9, wherein said coupling portion has two of said through holes spaced apart from each other in a third direction which is transverse to both the first and second directions;

wherein said coupler includes two of said retained pieces spaced apart from each other such that when said coupling portion is brought into coupling engagement with said coupler, said retained pieces are respectively inserted through said first hole portions of said through holes; and wherein said slider unit includes two of said latch pieces mounted on said second slide block such that when said latch pieces are in the locked position, said latch pieces are extended out of said second hole portions of said through holes so as to retain said retained pieces, respectively.

11. The display assembly according to claim 10, wherein said second slide block has two lateral ends opposite to each other in the third direction, and said latch pieces are mounted respectively to the two lateral ends of said second slide block;

wherein said locking mechanism further includes two stages which are mounted on said second major surface of said retaining mount to extend respectively in the first direction, and which are spaced apart from each other in the third direction; and wherein said locking mechanism includes two of said biasing springs each of which is disposed between a respective one of said latch pieces and a respective one of said stages so as to bias the respective latch piece to the locked position.

12. The display assembly according to claim 9, wherein said locking mechanism further includes a pair of guiding pins which extend respectively in the first direction, and which are mounted on said second major surface of said retaining mount at two opposite sides of said passage; and wherein said first slide block includes
  a rear pushed segment disposed to be pushed by said first major magnetically attractive member so as to cause movement of said first slide block to the distal position, and
  a front pushing segment which is connected to said rear pushed segment, and which has said first contact structure that is opposite to said rear pushed segment in the first direction, said front pushing segment having two ear regions which are disposed at two opposite sides of said rear pushed segment, each of said ear regions being formed with a first guided hole configured for extension of a respective one of said guiding pins so as to permit the sliding movement of said first slide block to be guided by said guiding pins.

13. The display assembly according to claim 9, wherein said first contact structure is a ramping surface, and said second contact structure has a beveled surface which is in movable contact with said ramping surface.

14. The display assembly according to claim 13, wherein said second contact structure has two protuberances which are respectively protruded in the first direction, and which respectively have two beveled edges that cooperatively define said beveled surface.

15. The display assembly according to claim 9, wherein said second slide block has a pair of second guided holes which extend respectively in the second direction and which are disposed at two opposite sides of said second contact structure, and said locking mechanism further includes a pair of guiding stems which are mounted on said second major surface of said retaining mount, and which extend in the first direction respectively through said second guided holes so as to permit sliding movement of said second slide block in the second direction to be guided by said guiding stems.

16. The display assembly according to claim 1, wherein said coupler further has at least one tab, and said coupling portion further has at least one retaining hole configured such that said coupling portion is permitted to be brought into coupling engagement with said coupler only when said tab is retained in said retaining hole, thereby allowing the retained piece to be inserted through said through hole.

* * * * *